United States Patent
McCain (10) Patent No.: US 7,254,739 B2
(45) Date of Patent: Aug. 7, 2007

(54) ERROR RECOVERY IN A CLIENT/SERVER APPLICATION USING TWO INDEPENDENT SOCKETS FOR COMMUNICATION

(75) Inventor: Brian S. McCain, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 806 days.

(21) Appl. No.: 10/716,961

(22) Filed: Nov. 19, 2003

(65) Prior Publication Data

US 2005/0138460 A1    Jun. 23, 2005

(51) Int. Cl.
*G06F 11/00* (2006.01)
*G06F 11/08* (2006.01)

(52) U.S. Cl. .................. 714/4; 714/15; 714/821; 710/38; 709/221; 709/227

(58) Field of Classification Search .................. None
See application file for complete search history.

(56) References Cited

U.S. PATENT DOCUMENTS

| | | | |
|---|---|---|---|
| 5,142,622 A | | 8/1992 | Owens |
| 5,652,832 A | | 7/1997 | Kane et al. |
| 5,754,752 A | * | 5/1998 | Sheh et al. ............. 714/4 |
| 5,802,306 A | | 9/1998 | Hunt |
| 5,941,950 A | | 8/1999 | Hwang et al. |
| 6,377,996 B1 | | 4/2002 | Lumelsky et al. |
| 6,484,206 B2 | | 11/2002 | Crump et al. |
| 6,487,677 B1 | | 11/2002 | Jantz et al. |
| 6,523,130 B1 | | 2/2003 | Hickman et al. |
| 6,732,186 B1 | * | 5/2004 | Hebert ............. 709/239 |
| 6,938,179 B2 | * | 8/2005 | Iyer et al. ............. 714/4 |
| 6,981,174 B1 | * | 12/2005 | Hanning ............. 714/5 |
| 2002/0078208 A1 | | 6/2002 | Crump et al. |
| 2002/0087700 A1 | * | 7/2002 | Chae ............. 709/227 |
| 2003/0140124 A1 | * | 7/2003 | Burns ............. 709/220 |

FOREIGN PATENT DOCUMENTS

| | | |
|---|---|---|
| GB | 2319161 A | 5/1998 |
| JP | 2002207647 A | 7/2002 |

OTHER PUBLICATIONS

N. Neves et al., "Fault Detection Using Hints from the Socket Layer", 1060-9857/97 *IEEE*, pp. 64-71, 1997.

* cited by examiner

*Primary Examiner*—Scott Baderman
*Assistant Examiner*—Joseph Schell
(74) *Attorney, Agent, or Firm*—Scully, Scott, Murphy & Presser, P.C.

(57) ABSTRACT

A technique for recovering from a socket error at a computer host. The host opens two sockets for communicating with respective sockets at another host. Failure recovery processes are provided for a client host on its server-initiated receive socket and its client-initiated send socket, and for a server host on its server-initiated receive socket and its client-initiated send socket. A failure may be cause by an operating system error, a lack of communication at the socket, or removal or failure of a communication medium such as a cable. When a failure condition is detected at one socket, the host attempts to use the other socket. If the other socket can be used, an attempt is made to reconnect the failed socket. An internal state is set at the host denoting a normal mode or an attempt to recover mode.

30 Claims, 7 Drawing Sheets

ERROR RECOVERY IN A CLIENT/SERVER APPLICATION USING TWO INDEPENDENT SOCKETS FOR COMMUNICATION

BACKGROUND OF THE INVENTION

1. Field of the Invention

The invention relates generally to the field of computer systems and, more specifically, to a technique for recovering from a single socket failure at a host using two independent sockets.

2. Description of the Related Art

Computer systems include host computers that communicate with one another via a network to run network applications. Such applications include earlier text-based applications that provide remote access to computers, electronic mail, file transfers, news groups and chats, as well as more recent multimedia applications such as the World Wide Web, Internet telephony, video conferencing and audio- and video-on-demand. Typically, software is distributed and run on two or more hosts or end systems to realize the application. For example, for a Web application, browser software on the user's host computer communicates with Web server software in a Web server. The processes running on the different hosts communicate with one another by exchanging messages across a network via sockets. The network applications have application-layer protocols that define the format and order of the messages that are exchanged between the processes. Moreover, the application-layer protocols define what actions to take when a message is transmitted or received. For example, HTTP is an application-layer protocol for the Web that defines how messages are passed between a browser and a Web server. SMTP is an application-layer protocol used for electronic mail.

In particular, a network application typically includes a client side and a server side. In this case, the application may be referred to as a client/server application. A client side on an end host may communicate with a server side on another host. The client is usually the host that initiates a communication or session with another host. In some cases, a host can implement both the client and server sides of an application. For example, a mail server can run the client side of SMTP for sending mail, as well as the server side of SMTP for receiving mail. In this case, the client-side host opens two sockets—one for sending mail and one for receiving mail. In other cases, a host can implement two sockets that are independent. For example, in client/server applications where communications are initiated by a client and a server independent of each other, two communication sockets at each host can be used to simplify the communication. However, this complicates error recovery when there is a socket failure since each socket can fail independently, without the other socket knowing. For example, it is not known if an individual socket has failed or if the entire connection has been lost. Recovery from these scenarios is also problematic.

BRIEF SUMMARY OF THE INVENTION

To overcome these and other deficiencies in the prior art, the present invention provides a technique for recovering from a socket failure in a host.

In a particular aspect of the invention, a method is provided for detecting a failure at a first host having a first socket and a second socket, where the first host's first socket is used for sending requests to a second host's first socket, and receiving responses from the second host's first socket, and the first host's second socket is used for receiving requests from the second host's second socket, and sending responses to the second host's second socket. The method includes detecting when a failure condition occurs at the first host's second socket, and, when the failure condition is detected: attempting to send a communication from the first host's first socket to the second host's first socket; if the attempt to send succeeds, closing the first host's second socket, then attempting to reconnect the first host's second socket; and, if the attempt to reconnect succeeds, setting an internal state to indicate that normal operation is resumed.

The above method is used with a server-initiated socket at a client host. Related methods for a client-initiated socket at a client host, and client- and server-initiated sockets at a server host, are also provided. Related host computer systems and program storage devices are also provided.

BRIEF DESCRIPTION OF THE DRAWINGS

These and other features, benefits and advantages of the present invention will become apparent by reference to the following text and figures, with like reference numbers referring to like structures across the views, wherein.

DETAILED DESCRIPTION OF THE INVENTION

Figure 1:
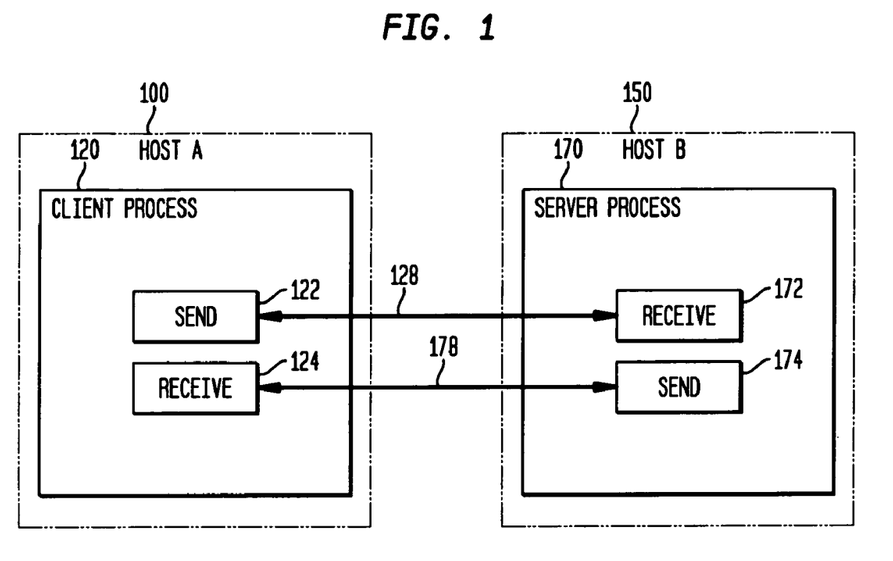
FIG. 1 illustrates a client process and a server process with send and receive sockets.

FIG. 1 illustrates a client process and a server process with send and receive sockets. A computer host 100 runs one or more client processes 120 with a first socket 122 and a second socket 124, while a corresponding computer host 150 runs one or more server processes 170 with a first socket 172 and a second socket 174. Each socket can communicate with the corresponding socket at the other host by sending and receiving data. Here, there are two communication paths 128, 178, which can be independent. One path 128 is between sockets 122 and 172, and the other path 178 is between sockets 124 and 174. In the host 100, the socket 122 is used to send requests to the socket 172 at the host 150, and to receive synchronous responses to those requests. The socket 124 is used by the host 100 to receive requests from the host 150 and send synchronous responses back in response. The socket 122 can be termed a "send" socket or a "client-initiated" socket since a client is the host or process that initiates a session with another host or process, termed the server, in a client-server application. Conversely, the socket 172 can be termed a "receive" socket or a "server-initiated" socket. The socket 172 is used by the server to receive requests from the client and send synchronous responses back. Likewise, the socket 124 can be termed a receive or server-initiated socket, and the socket 174 can be termed a send or client-initiated socket. The socket 174 is used by the server to send requests to the client and receive synchronous responses back in response. The two communication paths 128, 178 can traverse any computer network such as the Internet.

Figure 2:
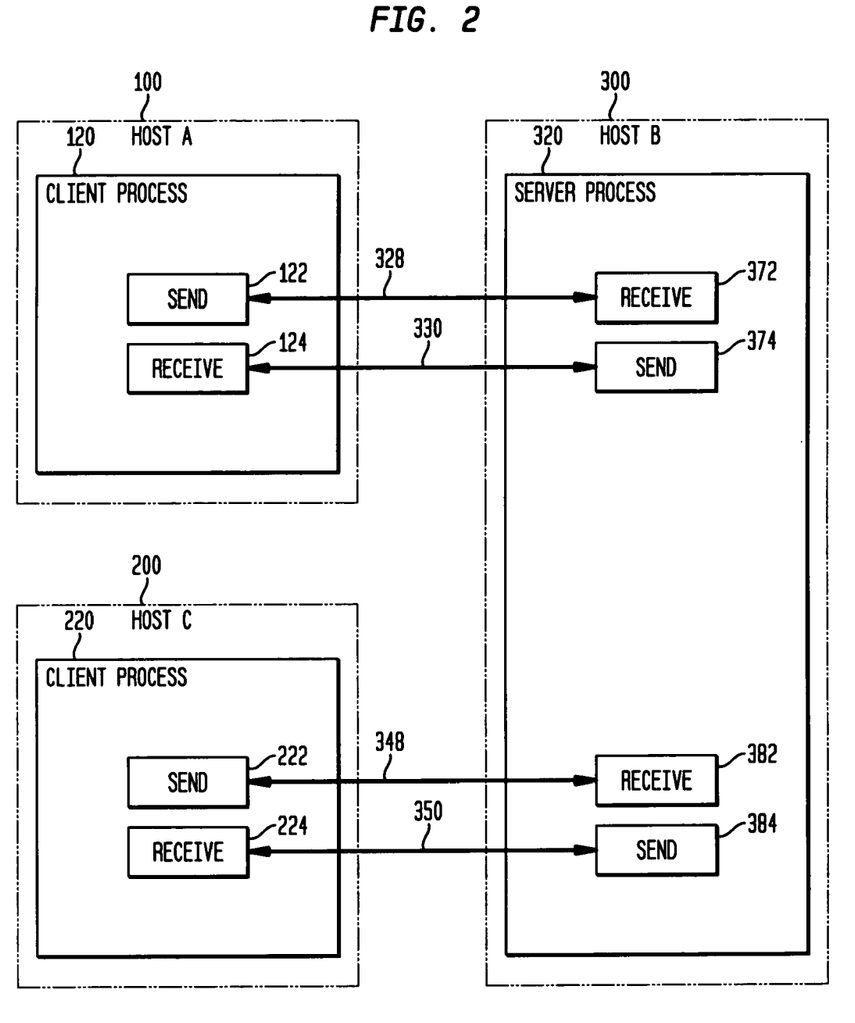
FIG. 2 illustrates two client processes and a server process with send and receive sockets.

FIG. 2 illustrates two client processes and a server process with send and receive sockets. Here, the host 100 and an additional host 200 both communicate with host 300. The host 100 has one or more processes 120 that use a send socket 122 to communicate with a receive socket 372 at the host 300 via a communication path 328, and a receive socket 124 to communicate with a send socket 374 at the host 300 via a communication path 330. The host 200 has one or more processes 220 that use a send socket 222 to communicate with the receive socket 382 at the host 300 via a communication path 348, and a receive socket 224 to communicate with the send socket 384 at the host 300 via a communication path 350. The socket failure recovery process described herein can be used generally at any host that communicates with one or more other hosts. The host 300 implements one or more processes 320 that use the sockets 372, 374, 382 and 384.

Figure 3:
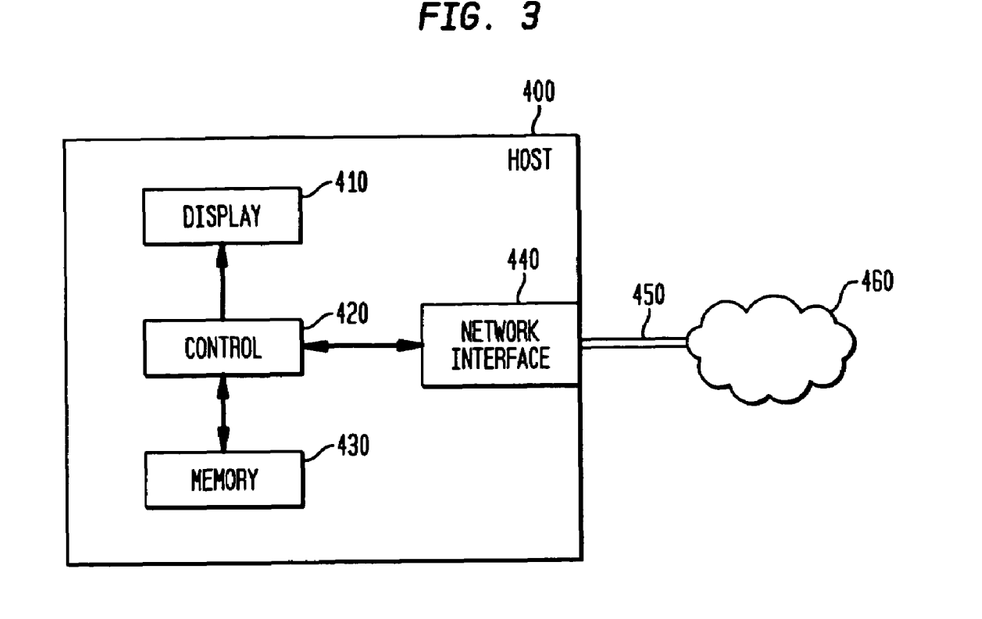
FIG. 3 illustrates a block diagram of a host.

FIG. 3 illustrates a block diagram of a host. The host 400 may be a conventional computer workstation, server, personal computer or other computer system, for instance. The host includes a control 420 that executes software instructions that are stored in a memory 430. Generally, the control 420 may execute any type of computer code devices, such as software, firmware, micro code or the like, to achieve the functionality described herein. Accordingly, a computer program product comprising such computer code devices may be provided in a manner apparent to those skilled in the art. Moreover, the memory 430 is a program storage device that tangibly embodies a program of instructions executable by a machine such as the control 420 to perform a method that achieves the functionality described herein. Such a program storage device may be provided in a manner apparent to those skilled in the art. A display 410 is optionally included with the host 400. A network interface 440 enables the host 400 to communicate with other hosts. For example, the network interface may be any network adapter card used for communicating with other hosts via a communication path 450 and a network 460.

Figure 4:
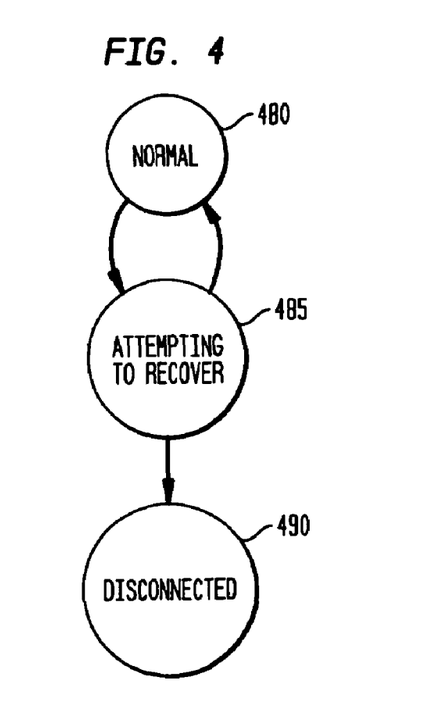
FIG. 4 illustrates a state diagram for a host recovery process.

FIG. 4 illustrates a state diagram for a host recovery process. As described further below, each host may maintain a state relating to the status of its sockets. A "normal" state 480 indicates both sockets are operating normally, and no problems have been detected. An "attempting to recover" state 485 indicates a problem has been detected with at least one of the sockets, and the host is attempting to resolve the problem. For example, a failure may be cause by an operating system error, a lack of communication at the socket, or removal or failure of a communication medium. A "disconnected" state 490 indicates the problem cannot be resolve, so the host with the problem is disconnecting from the other host. Other states may be maintained if desired, e.g., relating to a specific type of problem that has been detected for a socket, and to a specific corrective measure that is being attempted.

The invention solves the problem of recovering from a socket error when two sockets are used at a host. In particular, the invention defines a procedure for recovering from a single socket failure that incorporates determining if the other socket has failed before attempting recovery. The process is applied to each socket on both the client and server sides. The result is four independent processes that work to recover from a failure. The four independent processes are described below.

Figure 5:
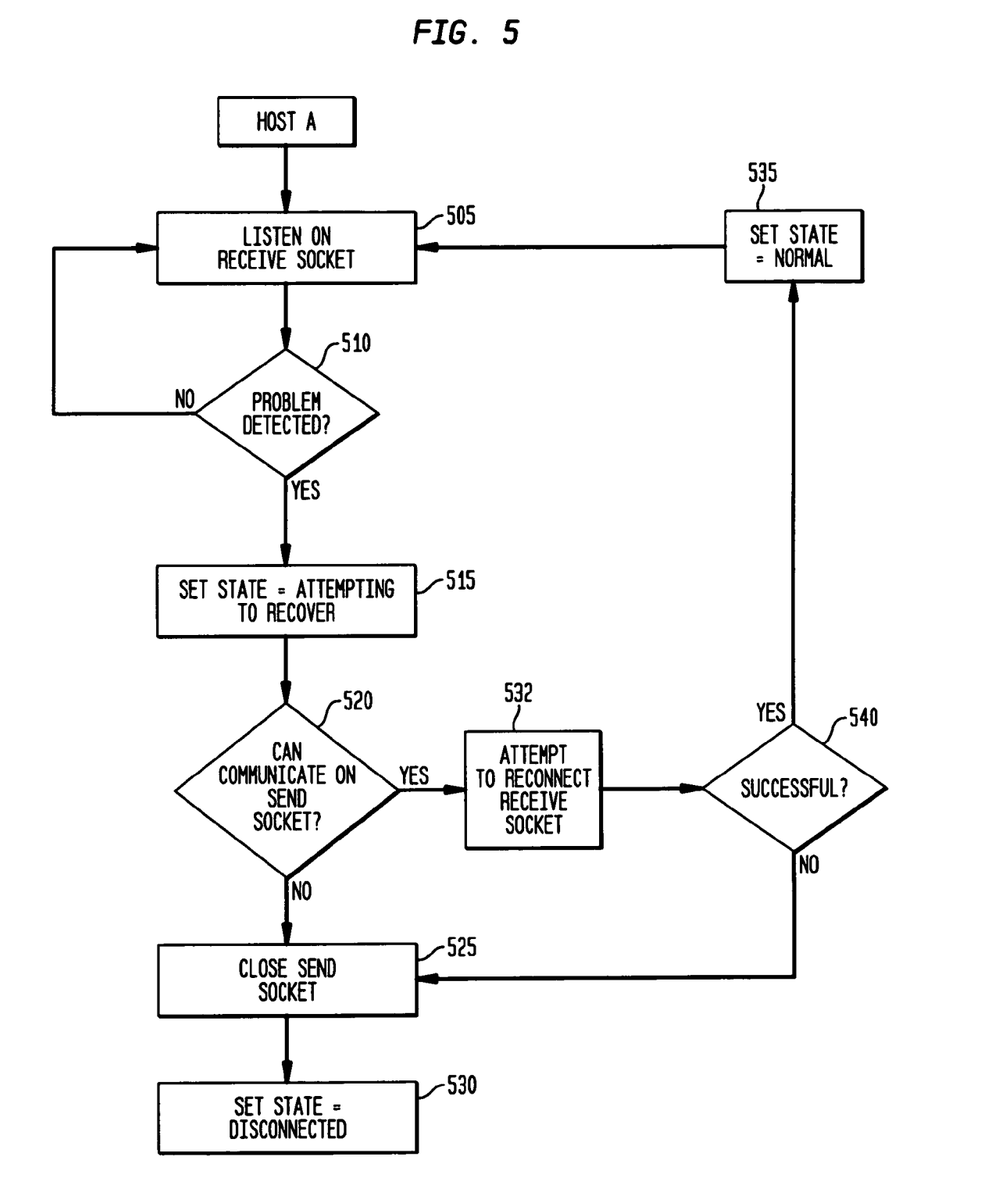
FIG. 5 illustrates a failure recovery process for a client host on its server-initiated receive socket.

FIG. 5 illustrates a failure recovery process for a client host on its server-initiated receive socket. For example, the client host, e.g., a first host, may be Host A 100 in FIG. 1, and the server-initiated receive socket may be the socket 124, e.g., a second socket. At block 505, the host listens on the server-initiated receive socket. Listening refers to waiting to receive a communication on a socket. For example, the server listens on the client-initiated or send socket, and the client listens on the server-initiated or receive socket. At block 510, if no problem is detected, the host continues listening. If a problem is detected while listening, the host sets its internal state to indicate it is attempting to recover from the problem (block 515). At block 520, the host determines whether it can communicate on the client-initiated send socket, e.g., a first socket such as socket 122, by attempting to send a communication on the client-initiated send socket. If the host cannot communicate on the send socket, it closes the send socket (block 525) and sets its internal state to indicate it is disconnected from the other host (block 530), e.g., a second host such as Host B 150. If the host can communicate on the send socket, it closes the receive socket, then attempts to reconnect the receive socket (block 532). If the reconnection succeeds (block 540), the host updates its state to indicate it has resumed normal operation (block 535), and the recovery is successful. If the reconnection fails, the host closes the client-initiated send socket (block 525) and sets internal state to disconnected (block 530).

Figure 6:
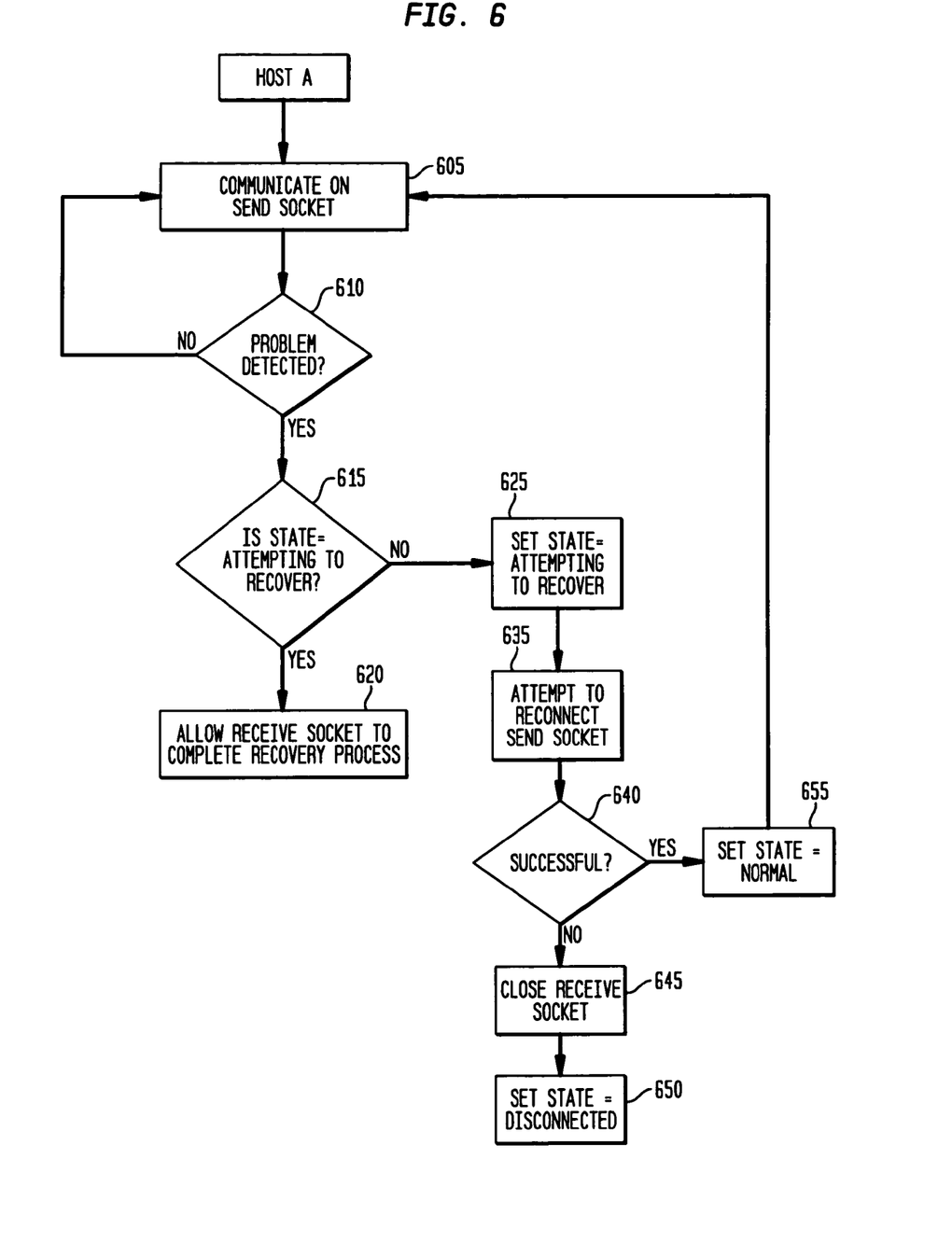
FIG. 6 illustrates a failure recovery process for a client host on its client-initiated send socket.

FIG. 6 illustrates a failure recovery process for a client host on its client-initiated send socket. For example, the client host, e.g., a first host, may be Host A 100 in FIG. 1, and the client-initiated send socket may be the socket 122, e.g., a first socket. At block 605, the host communicates on the send socket such as by sending a communication to a second host, e.g., Host B 150, or reading a response from the second host. At block 610, if a socket problem is detected while sending a communication to the second host or reading a response from the second host on the send socket, the host checks its internal state. If the internal state indicates the host is attempting to recover from a socket failure (block 615), e.g., on the other, second socket 124, which is the client-side server-initiated receive socket, the host stops and allows the receive socket recovery process to attempt the recovery (block 620). A constraint for the recovery may be imposed such as a time limit or maximum number of tries. If the internal state indicates the host is operating normally, and not attempting to recover, it sets its internal state to indicate that it is attempting to recover (block 625). At block 635, the host attempts to reconnect client-initiated send socket. If the reconnect attempt succeeds (block 640), recovery is successful, and the host sets its internal state to indicate it has resumed normal operation (block 655). If the reconnect attempt fails, the host closes the server-initiated receive socket (block 645) and sets its internal state to indicate that it is disconnected from the second host (block 650).

Figure 7:
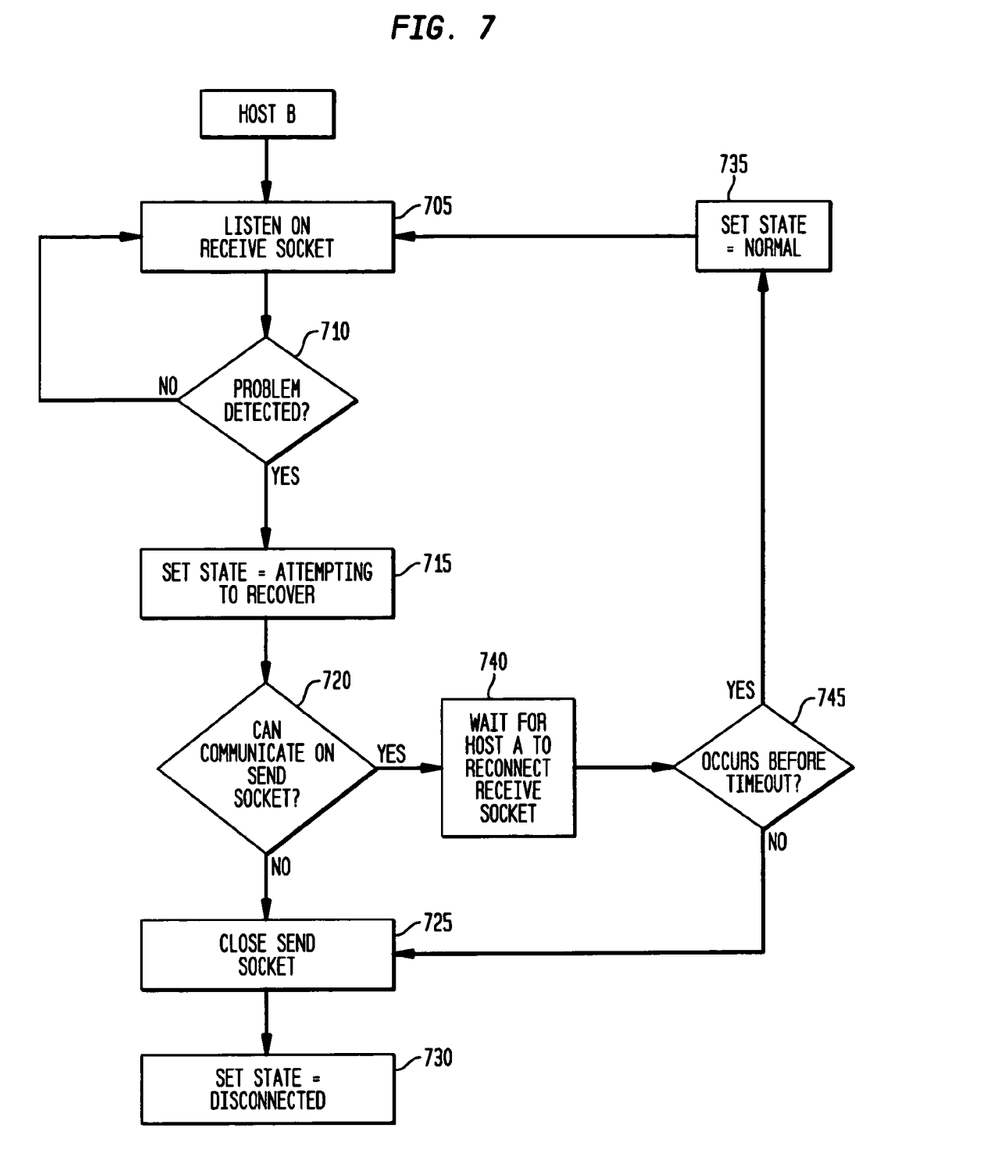
FIG. 7 illustrates a failure recovery process for a server host on its server-initiated receive socket.

FIG. 7 illustrates a failure recovery process for a server host on its server-initiated receive socket. For example, the server host, e.g., a first host, may be Host B 150 in FIG. 1, and the server-initiated receive socket may be the socket 172, e.g., a first socket. At block 705, the host listens on the server-initiated receive socket. At block 710, if no problem is detected, the host continues listening. If a problem is detected while listening, the host sets its internal state to indicate it is attempting to recover from the problem (block 715). At block 720, the host determines whether it can communicate on the client-initiated send socket, e.g., a second socket such as socket 174, by attempting to send a communication on the send socket. If the host cannot communicate on the send socket, it closes the send socket (block 725) and sets its internal state to indicate it is disconnected from the other host (block 730), e.g., a second host. If the host can communicate on the send socket, it waits for the client host (e.g., Host A 100) to reconnect the receive socket, e.g., socket 172. If the reconnection succeeds before a timeout (block 745), the host updates its state to indicate it has resumed normal operation (block 735), and the recovery is successful. If the reconnection fails, the host closes the client-initiated send socket (block 725) and sets internal state to disconnected (block 730).

Figure 8:
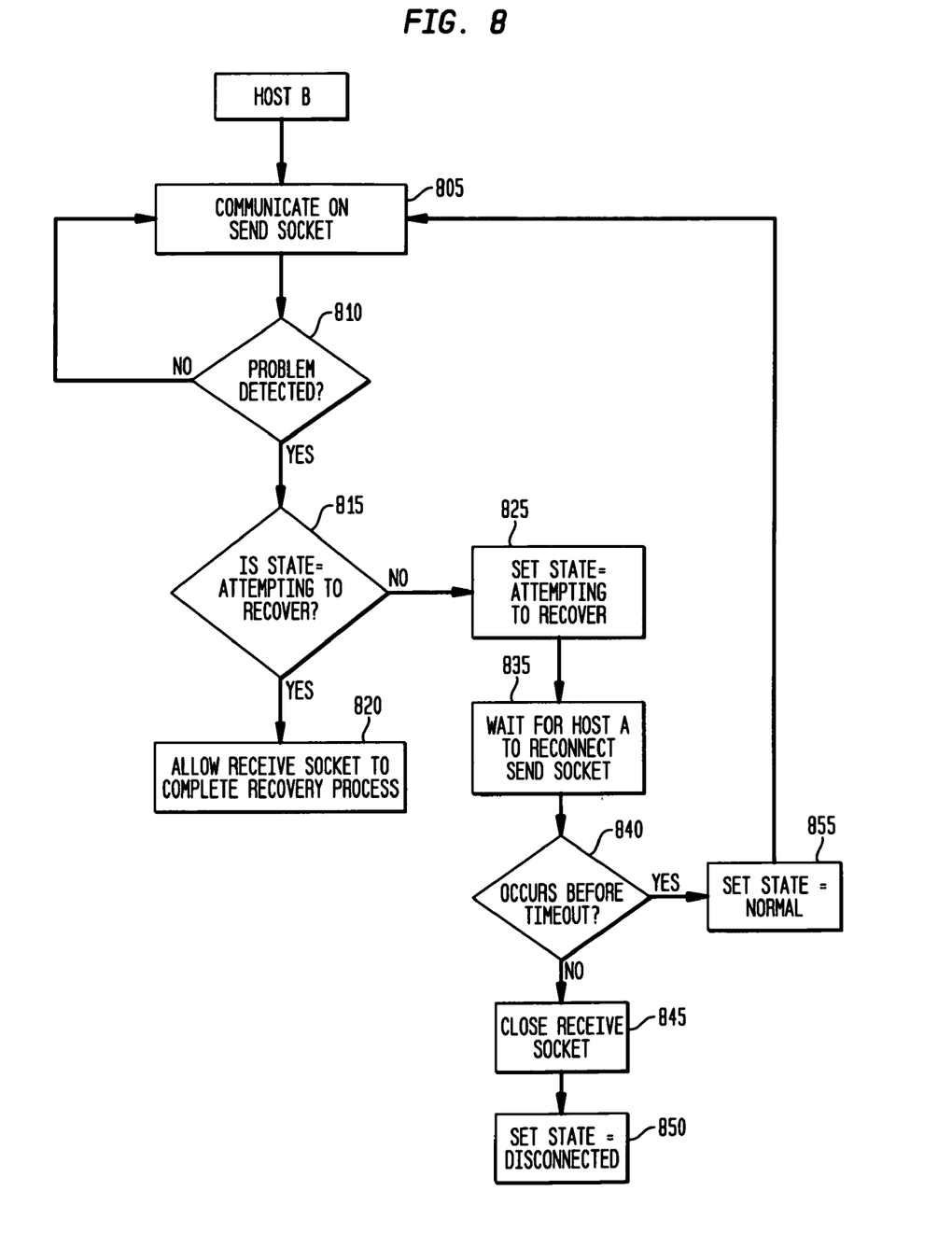
FIG. 8 illustrates a failure recovery process for a server host on its client-initiated send socket.

FIG. 8 illustrates a failure recovery process for a server host on its client-initiated send socket. For example, the server host, e.g., a first host, may be Host B 150 in FIG. 1, and the client-initiated send socket may be the socket 174, e.g., a second socket. At block 805, the host communicates on the send socket such as by sending a communication to a second host, e.g., Host A 100, via socket 124, or reading a response from the second host. At block 810, if a socket problem is detected while sending a communication to the second host or reading a response from the second host on the send socket, the host checks its internal state. If the internal state indicates the host is attempting to recover from a socket failure (block 815), e.g., on the other, first socket 172, which is the server-side server-initiated receive socket, the host stops and allows the receive socket recovery process to attempt the recovery (block 820). A constraint for the recovery may be imposed such as a time limit or maximum number of tries. If the internal state indicates the host is operating normally, and not attempting to recover, it sets its internal state to indicate that it is attempting to recover (block 825). At block 835, the host waits for the client host (e.g., Host A 100) to reconnect the receive socket, e.g., socket 172. If the reconnect attempt succeeds before a timeout (block 840), recovery is successful, and the host sets its internal state to indicate it has resumed normal operation (block 855). If the reconnect attempt fails, the host closes the server-initiated receive socket (block 845) and sets its internal state to indicate that it is disconnected from the second host (block 850).

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A method for detecting a failure at a first host having a first socket and a second socket, wherein the first host's first socket is used for sending requests to a second host's first socket, and receiving responses from the second host's first socket, and the first host's second socket is used for receiving requests from the second host's second socket, and sending responses to the second host's second socket, comprising:

detecting when a failure condition occurs at the first host's second socket, and, when the failure condition is detected:

attempting to send a communication from the first host's first socket to the second host's first socket;

if the attempt to send succeeds, closing the first host's second socket, then attempting to reconnect the first host's second socket; and if the attempt to reconnect succeeds, setting an internal state to indicate that normal operation is resumed.

2. The method of claim 1, further comprising:

when the failure condition is detected, setting an internal state to indicate the first host is attempting to recover from the failure condition.

3. The method of claim 1, wherein:

the first host's first socket and the first host's second socket are independent of one another.

4. The method of claim 1, further comprising:

if the attempt to send fails, closing the first host's first socket; and if the attempt to reconnect fails, closing the first host's first socket.

5. The method of claim 1, wherein:

detecting when a failure condition occurs comprises detecting when no communication has been received from the second host's second socket at the first host's second socket in reply to a communication sent to the second host's second socket by the first host's second socket.

6. The method of claim 1, wherein:

detecting when a failure condition occurs comprises detecting at least one of: (a) when a communication medium used by the first host's second socket has been disconnected from the first host, and (b) when an operating system of the first host reports an error.

7. A first host, comprising:

a first socket and a second socket;

wherein the first host's first socket is used for sending requests to a second host's first socket, and receiving responses from the second host's first socket, and the first host's second socket is used for receiving requests from the second host's second socket, and sending responses to the second host's second socket;

a memory for storing software instructions; and a control associated with the memory for executing the software instructions for:

detecting when a failure condition occurs at the first host's second socket, and, when the failure condition is detected:

attempting to send a communication from the first host's first socket to the second host's first socket;

if the attempt to send succeeds, closing the first host's second socket, then attempting to reconnect the first host's second socket; and if the attempt to reconnect succeeds, setting an internal state to indicate that normal operation is resumed.

8. A program storage device, tangibly embodying a program of instructions executable by a first host to perform a method for detecting a failure, the first host having a first socket and a second socket, wherein the first host's first socket is used for sending requests to a second host's first socket, and receiving responses from the second host's first socket, and the first host's second socket is used for receiving requests from the second host's second socket, and sending responses to the second host's second socket, the method comprising:

detecting when a failure condition occurs at the first host's second socket, and, when the failure condition is detected:

attempting to send a communication from the first host's first socket to the second host's first socket;

if the attempt to send succeeds, closing the first host's second socket, then attempting to reconnect the first host's second socket; and if the attempt to reconnect succeeds, setting an internal state to indicate that normal operation is resumed.

9. A method for detecting a failure at a first host having a first socket and a second socket, wherein the first host's first socket is used for sending requests to a second host's first socket, and receiving responses from the second host's first socket, and the first host's second socket is used for receiving requests from the second host's second socket, and sending responses to the second host's second socket, the method comprising:
   detecting when a failure condition occurs at the first host's first socket, and, when the failure condition is detected:
   checking an internal state to determine whether the first host is attempting to recover from a failure condition detected at the first host's second socket;
   if the internal state indicates the first host is attempting to recover, allowing the first host to attempt to recover;
   if the internal state indicates the first host is not attempting to recover, attempting to reconnect the first host's first socket; and
   if the attempt to reconnect succeeds, setting an internal state to indicate that normal operation is resumed.

10. The method of claim 9, wherein:
    the first host's first socket and the first host's second socket are independent of one another.

11. The method of claim 9, wherein:
    detecting when a failure condition occurs comprises detecting when a problem occurs in at least one of sending a communication from the first host's first socket to the second host's first socket, and receiving a communication from the second host's first socket at the first host's first socket.

12. The method of claim 9, wherein:
    detecting when a failure condition occurs comprises detecting when no communication has been received from the second host's first socket at the first host's first socket in reply to a communication sent to the second host's first socket by the first host's first socket.

13. The method of claim 9, further comprising:
    if the attempt to reconnect fails, closing the first host's second socket.

14. A first host, comprising:
    a first socket and a second socket;
    wherein the first host's first socket is used for sending requests to a second host's first socket, and receiving responses from the second host's first socket, and the first host's second socket is used for receiving requests from the second host's second socket, and sending responses to the second host's second socket;
    a memory for storing software instructions; and
    a control associated with the memory for executing the software instructions for:
    detecting when a failure condition occurs at the first host's first socket, and, when the failure condition is detected:
    checking an internal state to determine whether the first host is attempting to recover from a failure condition detected at the first host's second socket;
    if the internal state indicates the first host is attempting to recover, allowing the first host to attempt to recover;
    if the internal state indicates the first host is not attempting to recover, attempting to reconnect the first host's first socket; and
    if the attempt to reconnect succeeds, setting an internal state to indicate that normal operation is resumed.

15. A program storage device, tangibly embodying a program of instructions executable by a first host to perform a method for detecting a failure, the first host having a first socket and a second socket, wherein the first host's first socket is used for sending requests to a second host's first socket, and receiving responses from the second host's first socket, and the first host's second socket is used for receiving requests from the second host's second socket, and sending responses to the second host's second socket, the method comprising:
    detecting when a failure condition occurs at the first host's first socket, and, when the failure condition is detected:
    checking an internal state to determine whether the first host is attempting to recover from a failure condition detected at the first host's second socket;
    if the internal state indicates the first host is attempting to recover, allowing the first host to attempt to recover;
    if the internal state indicates the first host is not attempting to recover, attempting to reconnect the first host's first socket; and
    if the attempt to reconnect succeeds, setting an internal state to indicate that normal operation is resumed.

16. A method for detecting a failure at a first host, the first host having a first socket and a second socket, wherein the first host's first socket is used for receiving requests from a second host's first socket, and sending responses to the second host's first socket, and the first host's second socket is used for sending requests to the second host's second socket, and receiving responses from the second host's second socket, the method comprising:
    detecting when a failure condition occurs at the first host's first socket, and, when the failure condition is detected:
    checking an internal state to determine whether the first host is attempting to recover from a failure condition detected at the first host's second socket;
    if the internal state indicates the first host is attempting to recover, allowing the first host to attempt to recover;
    if the internal state indicates the first host is not attempting to recover, closing the first host's first socket and waiting for the second host to reconnect the first host's first socket; and
    if the attempt to reconnect succeeds, setting an internal state to indicate that normal operation is resumed.

17. The method of claim 16, wherein:
    the first host's first socket and the first host's second socket are independent of one another.

18. The method of claim 16, wherein:
    detecting when a failure condition occurs comprises detecting when a problem occurs in at least one of sending a communication from the first host's first socket to the second host's first socket, and receiving a communication from the second host's first socket at the first host's first socket.

19. The method of claim 16, wherein:
    detecting when a failure condition occurs comprises detecting when no communication has been received from the second host's first socket at the first host's first socket in reply to a communication sent to the second host's first socket by the first host's first socket.

20. The method of claim 16, further comprising:
    if the attempt to reconnect fails, closing the first host's second socket.

21. A first host, comprising:
    a first socket and a second socket;
    wherein the first host's first socket is used for receiving requests from a second host's first socket, and sending responses to the second host's first socket, and the first host's second socket is used for sending requests to the second host's second socket, and receiving responses from the second host's second socket;

a memory for storing software instructions; and
a control associated with the memory for executing the software instructions for:
detecting when a failure condition occurs at the first host's first socket, and, when the failure condition is detected:
checking an internal state to determine whether the first host is attempting to recover from a failure condition detected at the first host's second socket;
if the internal state indicates the first host is attempting to recover, allowing the first host to attempt to recover;
if the internal state indicates the first host is not attempting to recover, closing the first host's first socket and waiting for the second host to reconnect the first host's first socket; and
if the attempt to reconnect succeeds, setting an internal state to indicate that normal operation is resumed.

22. A program storage device, tangibly embodying a program of instructions executable by a first host to perform a method for detecting a failure, the first host having a first socket and a second socket, wherein the first host's first socket is used for receiving requests from a second host's first socket, and sending responses to the second host's first socket, and the first host's second socket is used for sending requests to the second host's second socket, and receiving responses from the second host's second socket, the method comprising:
detecting when a failure condition occurs at the first host's first socket, and, when the failure condition is detected:
checking an internal state to determine whether the first host is attempting to recover from a failure condition detected at the first host's second socket;
if the internal state indicates the first host is attempting to recover, allowing the first host to attempt to recover;
if the internal state indicates the first host is not attempting to recover, closing the first host's first socket and waiting for the second host to reconnect the first host's first socket; and
if the attempt to reconnect succeeds, setting an internal state to indicate that normal operation is resumed.

23. A method for detecting a failure at a first host, the first host having a first socket and a second socket, wherein the first host's first socket is used for receiving requests from a second host's first socket, and sending responses to the second host's first socket, and the first host's second socket is used for sending requests to the second host's second socket, and receiving responses from the second host's second socket, the method comprising:
detecting when a failure condition occurs at the first host's second socket, and, when the failure condition is detected:
attempting to send a communication from the first host's first socket to the second host's first socket;
if the attempt to send succeeds, closing the first host's second socket and waiting for the second host to reconnect the first host's second socket; and
if the attempt to reconnect succeeds, setting an internal state to indicate that normal operation is resumed.

24. The method of claim 23, further comprising:
when the failure condition is detected, setting an internal state to indicate the first host is attempting to recover from the failure condition.

25. The method of claim 23, wherein:
the first host's first socket and the first host's second socket are independent of one another.

26. The method of claim 23, further comprising:
if the attempt to send fails, closing the first host's first socket; and
if the attempt to reconnect fails within a specified waiting period, closing the first host's first socket.

27. The method of claim 23, wherein:
detecting when a failure condition occurs comprises detecting when no communication has been received from the second host's second socket at the first host's second socket in reply to a communication sent to the second host's second socket by the first host's second socket.

28. The method of claim 23, wherein:
detecting when a failure condition occurs comprises detecting at least one of: (a) when a communication medium used by the first host's second socket has been disconnected from the first host, and (b) when an operating system of the first host reports an error.

29. A first host, comprising:
a first socket and a second socket;
wherein the first host's first socket is used for receiving requests from a second host's first socket, and sending responses to the second host's first socket, and the first host's second socket is used for sending requests to the second host's second socket, and receiving responses from the second host's second socket;
a memory for storing software instructions; and
a control associated with the memory for executing the software instructions for:
detecting when a failure condition occurs at the first host's second socket, and, when the failure condition is detected:
attempting to send a communication from the first host's first socket to the second host's first socket;
if the attempt to send succeeds, closing the first host's second socket and waiting for the second host to reconnect the first host's second socket; and
if the attempt to reconnect succeeds, setting an internal state to indicate that normal operation is resumed.

30. A program storage device, tangibly embodying a program of instructions executable by a first host to perform a method for detecting a failure, the first host having a first socket and a second socket, wherein the first host's first socket is used for receiving requests from a second host's first socket, and sending responses to the second host's first socket, and the first host's second socket is used for sending requests to the second host's second socket, and receiving responses from the second host's second socket, the method comprising:
detecting when a failure condition occurs at the first host's second socket, and, when the failure condition is detected:
attempting to send a communication from the first host's first socket to the second host's first socket;
if the attempt to send succeeds, closing the first host's second socket and waiting for the second host to reconnect the first host's second socket; and
if the attempt to reconnect succeeds, setting an internal state to indicate that normal operation is resumed.

* * * * *